(12) United States Patent
Egenter et al.

(10) Patent No.: US 11,041,628 B2
(45) Date of Patent: Jun. 22, 2021

(54) METHOD FOR CONTROLLING A COOKING APPLIANCE USING AN EXTERNAL CONTROL DEVICE, COOKING APPLIANCE AND SYSTEM

(71) Applicant: E.G.O. Elektro-Geraetebau GmbH, Oberderdingen (DE)

(72) Inventors: Christian Egenter, Bretten (DE); Marcus Frank, Sulzfeld (DE); Uwe Schaumann, Oberderdingen (DE); Kay Schmidt, Oberderdingen-Flehingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 266 days.

(21) Appl. No.: 16/185,173

(22) Filed: Nov. 9, 2018

(65) Prior Publication Data

US 2019/0154266 A1    May 23, 2019

(30) Foreign Application Priority Data

Nov. 22, 2017    (DE) .................... 10 2017 220 815.5

(51) Int. Cl.
*F24C 7/08*    (2006.01)
*A47J 36/32*    (2006.01)
(Continued)

(52) U.S. Cl.
CPC .............. *F24C 7/082* (2013.01); *A47J 27/62* (2013.01); *A47J 36/321* (2018.08); *F24C 7/081* (2013.01);
(Continued)

(58) Field of Classification Search
CPC .......... A47J 27/62; A47J 27/56; A47J 36/321; H04L 2012/285; H05B 6/062; F24C 7/087
(Continued)

(56) References Cited

U.S. PATENT DOCUMENTS

| 9,860,362 B2 | 1/2018 | Kuemmerle et al. |
| 2014/0292536 A1 | 10/2014 | Barth et al. |

(Continued)

FOREIGN PATENT DOCUMENTS

| DE | 19802558 A1 | 7/1999 |
| DE | 102009000652 A1 | 8/2010 |

(Continued)

OTHER PUBLICATIONS

German Patent and Trade Mark Office, Office Action for Application No. 102017220815.5, dated Aug. 1, 2018, 5 pages, Germany.

(Continued)

*Primary Examiner* — Reginald Alexander
(74) *Attorney, Agent, or Firm* — Alston & Bird LLP

(57) ABSTRACT

In a method for controlling a cooking appliance having heating devices and an internal cooking appliance controller by means of an external control device which is arranged outside the cooking appliance and may be a mobile telephone, this external control device provides the cooking appliance controller with control commands. The external control device is classified by the cooking appliance controller either as an automatic control device or as a manual control device, wherein its control commands are implemented by the cooking appliance controller after the classification. A check is carried out continuously or at intervals during operation of the cooking appliance in order to determine whether the classification still applies.

28 Claims, 2 Drawing Sheets

(51) Int. Cl.
  *A47J 27/62* (2006.01)
  *G08C 17/02* (2006.01)
  *H04L 12/28* (2006.01)
  *A47J 27/56* (2006.01)
  *H05B 6/06* (2006.01)

(52) U.S. Cl.
  CPC .............. *F24C 7/087* (2013.01); *G08C 17/02* (2013.01); *H04L 12/282* (2013.01); *A47J 27/56* (2013.01); *H04L 2012/285* (2013.01); *H05B 6/062* (2013.01)

(58) Field of Classification Search
  USPC .................................................. 99/331, 325
  See application file for complete search history.

(56) References Cited

U.S. PATENT DOCUMENTS

| | | | |
|---|---|---|---|
| 2015/0042453 A1 | 2/2015 | Beifuss et al. | |
| 2016/0174748 A1 | 6/2016 | Baldwin et al. | |
| 2017/0135159 A1 | 5/2017 | Sorenson et al. | |
| 2017/0163438 A1* | 6/2017 | Gary, Jr. | H04L 67/2814 |
| 2017/0310810 A1* | 10/2017 | Kuemmerle | F24C 7/08 |

FOREIGN PATENT DOCUMENTS

| | | | |
|---|---|---|---|
| DE | 102009000652 A1 | 8/2010 | |
| DE | 102011085526 A1 | 5/2013 | |
| DE | 102012205621 A1 | 10/2013 | |
| DE | 102014007177 A1 | 11/2015 | |
| DE | 102014215705 A1 | 2/2016 | |
| DE | 102016206912 A1 | 10/2017 | |
| EP | 3236709 A1 | 10/2017 | |
| WO | WO-2017116099 A1 * | 7/2017 | F24C 3/126 |
| WO | WO-2017/143186 A1 | 8/2017 | |

OTHER PUBLICATIONS

European Patent Office, European Search Report for European Patent Application No. 18200649.4, dated Mar. 22, 2019, 9 pages, English Translation Not Available.

* cited by examiner

METHOD FOR CONTROLLING A COOKING APPLIANCE USING AN EXTERNAL CONTROL DEVICE, COOKING APPLIANCE AND SYSTEM

FIELD OF APPLICATION AND PRIOR ART

The invention relates to a method for controlling a cooking appliance, in particular a hob or an oven, using an external control device. The invention also relates to such a cooking appliance and to a system having a cooking appliance and an external control device.

The networking of electrical devices, in particular also cooking appliances, in the private household is increasing more and more. In this case, the intention is to provide, in particular, more possible ways of controlling cooking appliances using an external control device, for example using a special external controller, on the one hand, or a mobile terminal, on the other hand. It may even be possible, under certain circumstances, to implement new functions such as program sequences or the like, which were previously not yet available in the cooking appliance, using the external control device.

DE 19802558 A1 discloses, for example, the practice of operating a hob as a cooking appliance using an external controller as a special control device.

OBJECT AND SOLUTION

The invention is based on the object of providing a method mentioned at the outset, a cooking appliance and a corresponding system, with which problems in the prior art can be solved and it is possible, in particular, to expand functionalities of a cooking appliance and to improve the operating comfort and to ensure, at the same time, that operating safety or operational safety of the cooking appliance is accomplished.

This object is achieved by means of a method for controlling a cooking appliance using an external control device having the following features: where the cooking appliance has at least one heating device and an internal cooking appliance controller; where the external control device is arranged outside the cooking appliance; where the external control device provides the cooking appliance controller with control commands for controlling at least the heating device; where the external control device is classified by the cooking appliance controller either as an automatic control device or as a manual control device; and, following the classification of the external control device, the control commands from the external control device are implemented by the cooking appliance controller, and a check is carried out continuously or at intervals during operation of the cooking appliance in order to determine whether the classification of the external control device still applies. The object is further achieved by a cooking appliance having at least one heating device an internal cooking appliance controller, where the cooking appliance controller is designed to carry out the foregoing method. The object is further achieved by a system having an external control device and the foregoing cooking appliance, where the external control device is designed to be arranged outside the cooking appliance and is designed to give the cooking appliance controller of the cooking appliance control commands for controlling at least the heating device. The further claims relate to advantageous and preferred configurations of the invention which are explained in more detail below. In this case, some of the features are described only for the method, only for the cooking appliance or only for the system. However, irrespective of this, they are intended to be able to apply autonomously and independently of one another both to the method and to a cooking appliance and to a corresponding system. The wording of the claims is incorporated in the content of the description by express reference.

Provision is made for the cooking appliance to have at least one heating device and an internal cooking appliance controller. The cooking appliance controller advantageously largely corresponds to a normal cooking appliance controller and has a communication module or the like in order to communicate with at least one external control device. This is advantageously carried out by means of radio, but, in simple variants, it could also be a cable connection, as is known, for example, from spits with temperature sensors in ovens. An external control device is provided and is arranged or can be arranged outside the cooking appliance, in particular in the case of an above-mentioned spit. Even if the latter is used inside an oven muffle, it is nevertheless considered to be able to be arranged outside the cooking appliance within the scope of this invention. Finally, it can be extracted and removed from the oven. During an operating method, this external control device provides the cooking appliance controller with control commands in order to control at least one heating device with said commands, possibly also a plurality of heating devices or further functional units of the cooking appliance. In this case, this external control device can provide the cooking appliance controller either with manually specified control commands or else automatic control commands. Manual control commands which then classify the control device as a manual control device are those for which an operator directly inputs or specifies a power setting or a timer input for the heating device, for example a power level of 8 or a timer setting of 20 min. In this case, no automatic programs, as are known, in particular, as cooking programs, run. In this case, any power change is manually or explicitly specified by an operator. Within the scope of this invention, this is also intended to be understood as meaning an input by means of gestures or voice, for which a hand movement is then possibly not absolutely necessary, but at least an explicit and deliberate specification by an operator.

In contrast to this, an automatic control device within the scope of this invention is intended to be understood as meaning the fact that a type of automatic program runs on the external control device. This program may start up or specify either particular temperature profiles or power profiles, in particular by means of automatic control commands, for example initially strong parboiling and boiling up with very high power and then further boiling with considerably reduced power for boiling potatoes or noodles. The cooking appliance controller is then provided with the corresponding control commands for the power specification by an automatic program in the external control device, which is then precisely an automatic control device, for implementation by the heating device or another functional device of the cooking appliance.

Another possibility for an automatic control device is such an external control device which has a temperature sensor or is connected to such a temperature sensor which is then arranged either in an oven muffle or in or on a cooking vessel for a hob. On the basis of the temperature signals provided, the external control device as an automatic control device can either keep a temperature constant by respectively adjusting the power or, as described above, can run through particular temperature profiles. A corresponding automatic program can be started once by an operator and is then carried out simply automatically, but not in the cooking appliance controller in the cooking appliance itself, but rather by the external control device.

The invention provides for the external control device to be classified by the cooking appliance controller as one of the two types mentioned above, that is to say either as an automatic control device or as a manual control device. On the basis of this, different safety precautions or safety levels can be complied with as it were for safe operation of the cooking appliance. This is because it can be assumed, in the case of a manual control device, that an operator provides a control command deliberately and also taking into account the situation on the cooking appliance and is furthermore also present when inputting the control command in order to be able to intervene in the case of critical situations. This cannot necessarily be assumed in the case of an automatic control device since it is suggested, in particular as a great advantage of such an automatic program sequence, that the operator himself does not have to carry out the latter and can rely on the automatic control device and need not be present. The usefulness of such an automatically generated control command is also not checked. This is explained in yet more detail below in connection with various advantageous configurations of the subject matter of the invention.

After the classification by the cooking appliance controller, the control commands from the external control device are implemented by the cooking appliance controller by accordingly operating the at least one heating device or other functional unit of the cooking appliance. In this case, within the scope of the invention, a check is carried out continuously or at intervals during operation of the cooking appliance or the heating device or functional unit in order to determine whether the classification carried out at the outset still applies. This is because, if the classification changes, particular changes must be carried out in the operation or in the behavior of the cooking appliance, which is likewise explained in yet more detail below.

A safety measure is therefore carried out by the cooking appliance or by the cooking appliance controller, which safety measure is relatively simple and relates substantially to a criterion which can be checked very well. The method has been described here for the use with one external control device, but a plurality of external control devices may also be used and may be connected to the cooking appliance. They may be identical or structurally identical so that a plurality of operators can operate the cooking appliance at the same time and in a comfortable manner. Alternatively, a plurality of external control devices may also be different, however. For an input by means of gestures and voice for example, two different external control devices may be provided, one with a camera and the other with a microphone.

Provision may be made for the cooking appliance to be able to be operated directly after transmitting the information for classification, which may come from the external control device itself, and after classification performed by the cooking appliance controller. Operation of a selected heating device can begin when a corresponding starting control command has been given by the external control device. Provision may therefore generally be made for the external control device to be able to give control commands after the classification has been concluded or after the external control device has been classified by the cooking appliance controller, which control commands are then also accordingly implemented. A further actuation or input on the cooking appliance itself again is not necessary.

Before the classification by the cooking appliance controller, for example when switching on the cooking appliance or the external control device, it is advantageously possible for the external control device to transmit an item of classification information to the cooking appliance controller. Said information may include whether the external control device has been identified or is intended to be classified as an automatic control device or as a manual control device. If the external control device is fundamentally configured in such a manner that it can operate both as a manual control device and as an automatic control device, it is either directly and exclusively identified and also accordingly classified as an automatic control device. Alternatively, provision may be made for it to be necessary to input on the external control device itself whether manual operation is provided, for example with positive and negative specifications for a power, or whether an automatic program is intended to be carried out. This input is then transmitted to the cooking appliance controller as classification information. In the event of a corresponding change to the handling of the external control device, another item of classification information can be transmitted, or the specification of control commands which is then changed is identified and implemented by the cooking appliance controller.

The cooking appliance controller can advantageously also consult further information as a criterion for the classification to be carried out. This information may be, for example, the type of control commands, a frequency of control commands, and a continuity or consistency of the control commands, in particular with respect to the consistency of a power level. This further information will be important during ongoing operation of the cooking appliance, in particular when it is necessary to check whether the classification initially carried out still applies.

In yet another configuration of the invention, if the continuous check or the check carried out at intervals reveals that the previous classification or the classification made initially still applies, it is possible for operation of the cooking appliance and of the heating device or functional unit of the cooking appliance, which are controlled by the external control device, to be continued as before. Operation therefore remains unchanged. In this case, control commands for changing power generation at the heating device can be particularly advantageously accepted from the external control device and implemented without change by the cooking appliance controller. This is because the cooking appliance controller can then assume that operation continues as before and there is therefore also no need to intervene and, in particular, no critical situation which would make such intervention necessary has occurred either.

In another configuration of the invention, if such a check reveals that the previous classification no longer applies, a reclassification of the external control device can be carried out. Such reclassification must then be even advantageously carried out. A reclassification should be carried out in a particularly advantageous manner or a new classification should be allocated only when not only the criteria for the previous classification are no longer satisfied but also when the criteria for the new classification are explicitly satisfied. The external control device can therefore then as it were not only fall out of the previous classification into a new classification, but rather it should also explicitly fit into the new classification. This applies, in particular, if the intention is to change from an automatic control device to a manual control device. In the event of a change in the other direction, it may suffice if the conditions for the manual control device are no longer satisfied; a change of the classification is ultimately a safety measure here.

When a check reveals that the previous classification no longer applies, wherein the external control device is no longer manually operated, in particular, but rather operates automatically or with a program as an automatic control device, another configuration of the invention may provide for the cooking appliance to be changed over to a so-called safety mode. In this safety mode, it can then no longer be assumed that the operator is close to the cooking appliance as before and can monitor processes taking place on the cooking appliance, which is why the operator precisely also operated the cooking appliance manually using the external control device. Rather, an automatic program or the like in the external control device then controls the at least one heating device or functional unit, which is less safe as it were. From now on, it may be good, in particular, for an operator to move away, which is why precisely such an automatic program might have been started. In one configuration of the invention, the power of a heating device currently operated and controlled by the external control device up to this time is then reduced. A reduction may be relatively great; for example, it can be reduced to a maximum of 20% of its previous heating power. Under certain circumstances, it may even be switched off entirely, which is due, in particular, to the fact that the previous monitoring function as a result of the presence of the operator is no longer available.

If the external control device is classified as an automatic control device, another configuration of the invention may provide for the cooking appliance controller to also request additional information in order to determine and check a type of temperature control by the external control device. In this case, it is possible to query, in particular, whether the operation of the heating device of the cooking appliance is a boiling process or a roasting process and what a desired setpoint temperature is for the temperature control. The difference is specifically, in particular, the fact that boiling processes are carried out at temperatures up to a maximum of 100° C., whereas a roasting process can reach temperatures of 200° C. to 250° C. However, this difference is significant and a possible risk is also greater at higher temperatures, that is to say during a roasting process. If a boiling process with water gets out of control or a cooking vessel with water and possibly food to be cooked therein is not switched off, the cooking vessel can usually boil dry and the food to be cooked can be deposited in the cooking vessel, that is to say can burn as it were, as maximum damage. Excessively high temperatures on a hob panel are avoided by means of known temperature control provided for this purpose, with the result that no further damage can arise. Even greater risks arise during a roasting process as a result of the higher temperatures. Provision can then be made, for example, for a heating power to be reduced more quickly or to be completely switched off in the event of inconsistent control commands from the external control device as an automatic control device.

In yet another configuration, in the case described above, it is also possible for additional information from the external control device to be compared during ongoing operation of the heating device. In particular, this may be an item of temperature information which comes from a temperature probe on the heating device or for the heating device or alternatively for the cooking vessel. It is also possible to determine, for example, whether the practice of increasing the power by means of corresponding control commands from the external control device results in an increased temperature in the heating device or in the cooking vessel. If this is not the case, there is an error and the power should be reduced or completely switched off.

In one configuration of the invention, provision may be made for the external control device to be an additional device, possibly also a device which can be subsequently added, or a user interface which can be subsequently connected. The external control device then has conventional operating elements, in particular buttons for adjusting the power. Such an external control device can advantageously be connected to the cooking appliance controller by means of a radio path, in particular by means of WLAN, Zigbee, Bluetooth or BLE. Alternatively, it could be an IR connection which would be more susceptible to faults, however, and needs a direct line of sight. In a first variant, such an external control device can be advantageously designed only for operation as a manual control device, that is to say virtually as an external operating device which can be a certain distance away from the cooking appliance.

In a second variant, such an external control device can be more complicated and can have automatic programs or the like, with the result that it can then also be in the form of an automatic control device and can operate as such, preferably in addition to possible operation with purely manual operation, that is to say as a manual control device. In the case of such an external control device, the distinction or classification according to the invention is important since both operating modes can occur as normal operation.

In a fundamentally different configuration of the invention, the external control device is a mobile terminal such as a smartphone, a PDA or a tablet computer. Such a complicated or complex external control device as it were can also be connected to the cooking appliance controller by means of an above-mentioned radio path with WLAN, Zigbee, Bluetooth or BLE. The mobile terminal can control the temperature directly or via an app running on it for the purpose of specifying a heating power for the heating device by means of control commands as automatic programs. Particular power profiles can thus be controlled over time. Such a mobile terminal is therefore often at least also used and classified as an automatic control device, in which case it is also possible, as with an external control device described above, to emit only manual control commands.

In one configuration of the invention, said automatic programs may be designed in such a manner that they specify power/time profiles or give them to the cooking appliance controller as control commands. An automatic control device is considerably more convenient if, in one configuration of the invention, the external control device is connected to a temperature sensor, that is to say a temperature sensor is present. It is then possible to specify not only a power profile but rather a controlled temperature profile. A temperature can likewise easily be kept only constant. A temperature probe is advantageously wirelessly connected to the external control device by means of a radio path, advantageously a radio path mentioned above. For a hob as a cooking appliance, the temperature sensor can be arranged on cookware or can be integrated in cookware. Alternatively, it could be in the form of a spit for use in an oven. Temperature sensors for arrangement on a cooking vessel are fundamentally known in the prior art. By means of such a temperature sensor, the external control device can control a controlled temperature profile or can control the temperature of the cookware and, for this purpose, can specify power control for the heating device of this cookware to the cooking appliance controller.

Alternatively, the external control device itself may have a temperature sensor and may also itself be arranged on cookware or integrated in cookware. It is then advantageously in the form of an external control device. In this case, the external control device is advantageously classified as an automatic control device and the capture of the temperature by the external control device itself actually then mainly makes sense.

If the external control device is classified as a manual control device and this also still applies after each check, provision may preferably be made for no restrictions or changes to be made to the control commands given by the external control device. This is because it is then assumed that the operation is actually carried out manually by an operator who is then present or is in the vicinity of the cooking appliance. The operator will probably be able to determine and avoid a possible critical state on the cooking appliance, which is why no safety measures have to be taken.

In one advantageous configuration of the invention, operation of the cooking appliance or of the heating device can be continued as before as long as the original classification still applies. There is then no reason to change operation.

In one development of the invention, during a continuous check or a check carried out at intervals in order to determine whether the classification still applies, provision is made for a temperature value of the cookware heated with the heating device or of the heating device itself to be queried. This query can also be made by the external control device. The cooking appliance controller can then check whether this temperature value corresponds to the heating energy previously given to the heating device for the cookware or whether it is plausible in view of this heating energy. If it is not, there is probably a problem or an error. The cooking appliance controller can then restrict the operation of the cooking appliance or can completely switch it off under certain circumstances.

During a check in order to determine whether the classification of the external control device still applies, a frequency of a power adjustment for the heating device can be advantageously captured as an indication of what type of control device is present. If the power is changed more than three times per minute, in particular more than five times or even more than 10 times, the classification is changed from a manual control device to an automatic control device. In the event of such a frequent change in the power specification, it can be assumed that this is not carried out by an operator, that is to say manually, but rather by an automatic control device with an automatic program or, in particular, temperature control. The power is then often generally adapted or adjusted in order to track the temperature. This is because the cooking appliance controller does not know and also does not need to know whether or not the external control device is connected to a temperature sensor.

In one configuration of the invention, during the check in order to determine whether the classification still applies, it is possible to capture whether the power is adjusted by the external control device either at irregular intervals of time or at regular intervals of time or with integer multiples, in particular single-digit multiples, of a particular time unit. In the case of irregular intervals of time, there is rather certainly manual operation, that is to say the control device is classified as a manual control device. In the other case, the external control device is classified as an automatic control device.

In one configuration of the invention, if classified as an automatic control device, provision may be made for the power of a heating device operated until just now by the external control device to be reduced if communication between the cooking appliance controller and the external control device is aborted. A reduction may be considerable, for example to a maximum of 20% of its maximum power. In particular, the heating device can be completely switched off. This is because, in the case of an automatic control device, it cannot be assumed that an operator is present. Operation of the cooking appliance is then fundamentally still possible by means of operating elements on the cooking appliance itself, preferably without restrictions. Ultimately, the operator is then necessarily present for this.

In the other case of classification as a manual control device, a heating device operated until just now by the external control device can continue to be operated if communication between the cooking appliance controller and the external control device is aborted. The heating device can preferably continue to be operated without change in terms of its power because, in the case of a manual control device, it can specifically be assumed that an operator is present.

A cooking appliance and at least one external control device can together form a system according to the invention. In this case, provision may be made for different external control devices to be able to cooperate with a cooking appliance, possibly also a plurality of control devices at the same time, with the result that it is possible to select external control devices with a different performance range and operating comfort. Retrofitting is thus also possible. A cooking appliance according to the invention can then be precisely prepared, in particular the cooking appliance controller is specifically designed, to communicate with at least one external control device and to classify the latter or to distinguish it from another external control device.

These and further features are apparent not only from the claims but also from the description and the drawings, where the individual features can in each case be realized on their own or jointly in the form of subcombinations in an embodiment of the invention and in other fields and can constitute advantageous and inherently protectable embodiments for which protection is claimed here. The subdivision of the application into individual sections and sub-headings does not restrict the general validity of the statements made thereunder.

BRIEF DESCRIPTION OF THE DRAWINGS

Exemplary embodiments of the invention are schematically illustrated in the drawings and are explained in more detail below. In the drawings.

DETAILED DESCRIPTION OF THE EXEMPLARY EMBODIMENTS

Figure 1:
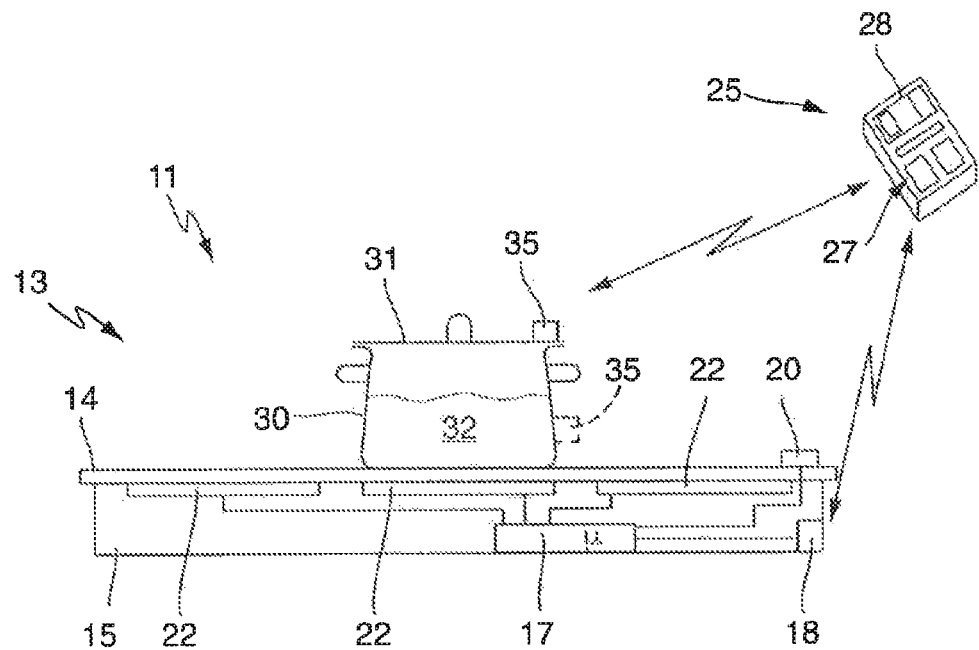
FIG. 1 shows an illustration of a first system according to the invention having a hob as a cooking appliance according to the invention and having a mobile telephone as an external control device.

FIG. 1 shows a system 11 according to the invention having a hob 13 as a cooking appliance according to the invention and a mobile telephone 25 as an external control device. The hob 13 has a structure which is conventional per se and has a hob panel 14 and a housing 15 underneath the latter, in which the functional units of the hob are arranged. These are a hob controller 17 which is connected to an operating device 20. The latter is illustrated on the hob panel 14 even though it should be arranged underneath it in practice. The operating device 20 has operating elements and a display, as is known. The hob controller 17 is also connected to a radio module 18 for the purpose of communicating with the mobile telephone 25. The radio module 18 can operate using a radio standard which is mastered by the mobile telephone, for example WLAN, Zigbee, Bluetooth or BLE. All three suffice for the ranges or distances usually desired or needed in practice. Alternatively, if another external control device is used instead of the mobile telephone, another radio standard can be used. The radio module can be arranged under the hob panel 14 in the housing 15 and, under certain circumstances, directly on the underside of the hob panel 14 for radio transmission which is as free of interference as possible. If the cooking appliance according to the invention is an oven, a spit advantageously used there could be connected, as an external control device having a temperature probe, to an oven controller by means of a cable since it is difficult to radio from an oven muffle. The cable connection to the oven controller would then correspond to the radio module 18 as the communication module for control, in particular a plug socket on an inner wall of the oven muffle.

The hob 13 also has heating devices 22 in the housing which are applied to the underside of the hob panel 14. These are advantageously induction heating coils 22 here, but may be any type of heating device, including radiation heating devices and gas or mixed forms thereof. The induction heating coils 22 can be operated individually or in a group as a cooking zone and with a common power level or power density, in which case they then operate precisely like a single heating device for the understanding of the present invention.

Placed on a central induction heating coil 22 is a cooking vessel 30 which has a lid 31 and contains water 32 for a boiling process, here because an operator wishes to boil noodles, for example. A temperature probe 35 is arranged, for example magnetically or clamped, on the lid 31. The temperature probe 35 determines the temperature at the lid, from which the temperature of the water 32 can be determined, for example by means of a sensor element which is pressed resiliently against the lid 31 and has direct contact. The position illustrated using dashed lines at the bottom right on the side of the cooking vessel 30 could be used as an alternative attachment point with the advantage that the temperature of the water 32 can be determined here in a relatively direct manner through the wall of the cooking vessel 30. A good emission freedom for the radio connection is also provided here even though not quite as good as at the top on the lid 31. As yet another alternative, a temperature probe 35 could also have a projecting temperature sensor which is arranged at the front on a short cable, for example. This projecting flexible temperature sensor can then project into the cooking vessel 30 from above and can be suspended in the water 32 in order to measure the water temperature directly with the greatest freedom from distortion. The temperature probe 35 could also generally have a plurality of temperature sensors for a distributed and better measurement. A temperature sensor which is inside the cooking vessel is likewise conceivable. This is conceivable, in particular, in the case of frying processes in pans.

The temperature probe 35 has a radio connection or is designed for such a connection and has an integrated radio module which is not illustrated, wherein a radio standard corresponds to that of the radio module 18. The energy is advantageously supplied by means of an installed rechargeable battery which is replaceable or can be designed for wireless or cable-based charging. In a very general manner, thermogenerators, photovoltaic modules or induction coils may likewise be present and ensure the supply of energy. The temperature probe 35 has precisely at least one temperature sensor which is not illustrated and is advantageously in contact with the cooking vessel or the lid 31. The temperature probe 35 sends signals containing the temperature information to the mobile telephone 25 via a radio connection. This can be carried out at predefinable intervals of time or in an event-based manner given a sufficiently large change in a temperature value, as is easily conceivable per se. The mobile telephone 25 then carries out an automatic program with the temperature information, for example for boiling noodles, as mentioned above. This automatic program can run on an app on the mobile telephone 25, which also allows operator inputs. These operator inputs may be different, for example the boiling of noodles as a main issue. A boiling time for the noodles, for example 10 minutes, can then be input as a subtopic. Alternatively, this could also be captured by a camera of the mobile telephone 25 by means of character recognition or as easily readable preparation information by means of a QR code or the like. Information or specifications can be input to the mobile telephone in a manner known per se using operating elements 27. Information can be displayed to an operator on a display 28. If the mobile telephone 25 is a smartphone or alternatively a tablet computer, it may have a known touchscreen which combines operating elements and a display.

After this automatic program has been started, the temperature probe 35 can be used to capture the temperature of the water 32. The automatic program first of all transmits control commands to the cooking appliance controller 17 via the radio module 18, which control commands are implemented by the cooking appliance controller 17 as a power specification for the induction heating coils 22. In order to quickly boil water, the power specification will usually be very high so that the water 32 boils quickly. If the temperature probe 35 has detected that the boiling point of the water 32 has been reached, it provides the cooking appliance controller 17 with this information via the automatic program. The cooking appliance controller then either generates a signal for the operator or the mobile telephone 25 itself. The operator can then put the noodles into the boiling water. The temperature probe 35 either detects this on the basis of a considerable temperature drop or the operator inputs it to the mobile telephone 25. The automatic program then adjusts the temperature of the water 32 to just below 100° C., generally by reducing the power specification after a minute, on the basis of the temperature information. At the end of the cooking process, the power is best completely switched off and a signal is emitted to the operator again.

In the previous example, the mobile telephone 25 operates as an automatic control device since an automatic program runs on it. However, it could also operate as a manual control device in an easily conceivable manner if an operator can input clear and direct operating commands on the mobile telephone 25, and on an external control device, which operating commands can be passed to the cooking appliance controller 17 as control commands. This would be, for example, a direct power specification, for example with power levels. In principle, such a direct power specification corresponds to an input like that on the operating device 20. The mobile telephone 25 can therefore be operated both as an automatic control device and as a manual control device and can then be a control device for the cooking appliance controller 17. A hob without classification according to the invention would therefore not notice this difference with the known disadvantages.

Figure 2:
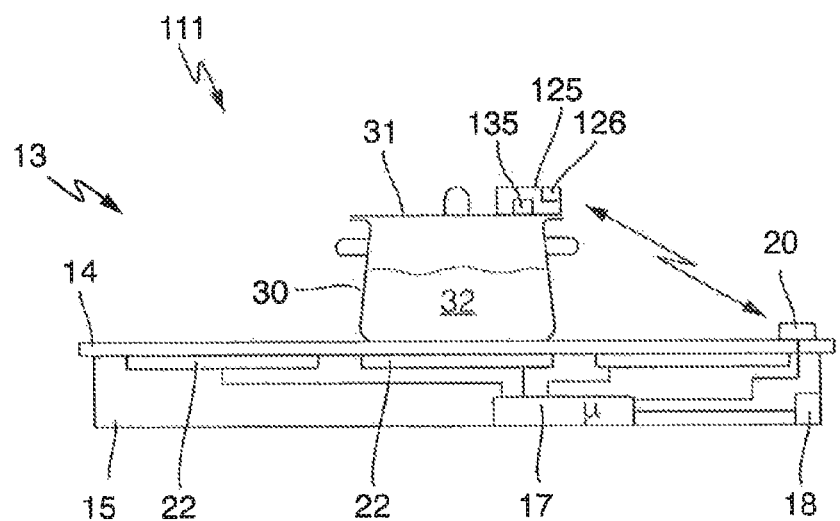
FIG. 2 shows an illustration of a second system according to the invention having a hob as a cooking appliance according to the invention and having a temperature probe as an external control device.

Another possibility with a pure automatic control device is illustrated in FIG. 2. Placed on the hob 11 from FIG. 1 is here again the cooking vessel 31 from FIG. 1, on the lid 31 of which a temperature control device 125 has been placed, in a similar manner to the temperature probe 35 above. The temperature control device 125 contains at least one temperature sensor 135 and a radio module as before, but additionally also a temperature controller 126. This temperature controller 126 contains a microcontroller having at least one automatic program and an input possibility, advantageously by means of operating elements and a display or touchscreen. As previously described for the mobile telephone 25 in FIG. 1, an automatic program can be selected and then carried out. The temperature control device 125 provides the cooking appliance controller with the control commands required for this purpose via the radio module 18 in order to accordingly control the heating devices for the purpose of controlling the temperature. In comparison with FIG. 1, the mobile telephone 25 which is interposed as it were is saved and is combined with the temperature probe for this purpose. The temperature control device 125 will advantageously and usually operate as an automatic control device, in any event will actually operate only as an automatic control device. Since completely independent operation is suggested to an operator in this case and the operator could then, however, move away during the run of the automatic program, an increased safety requirement applies here.

Figure 3:
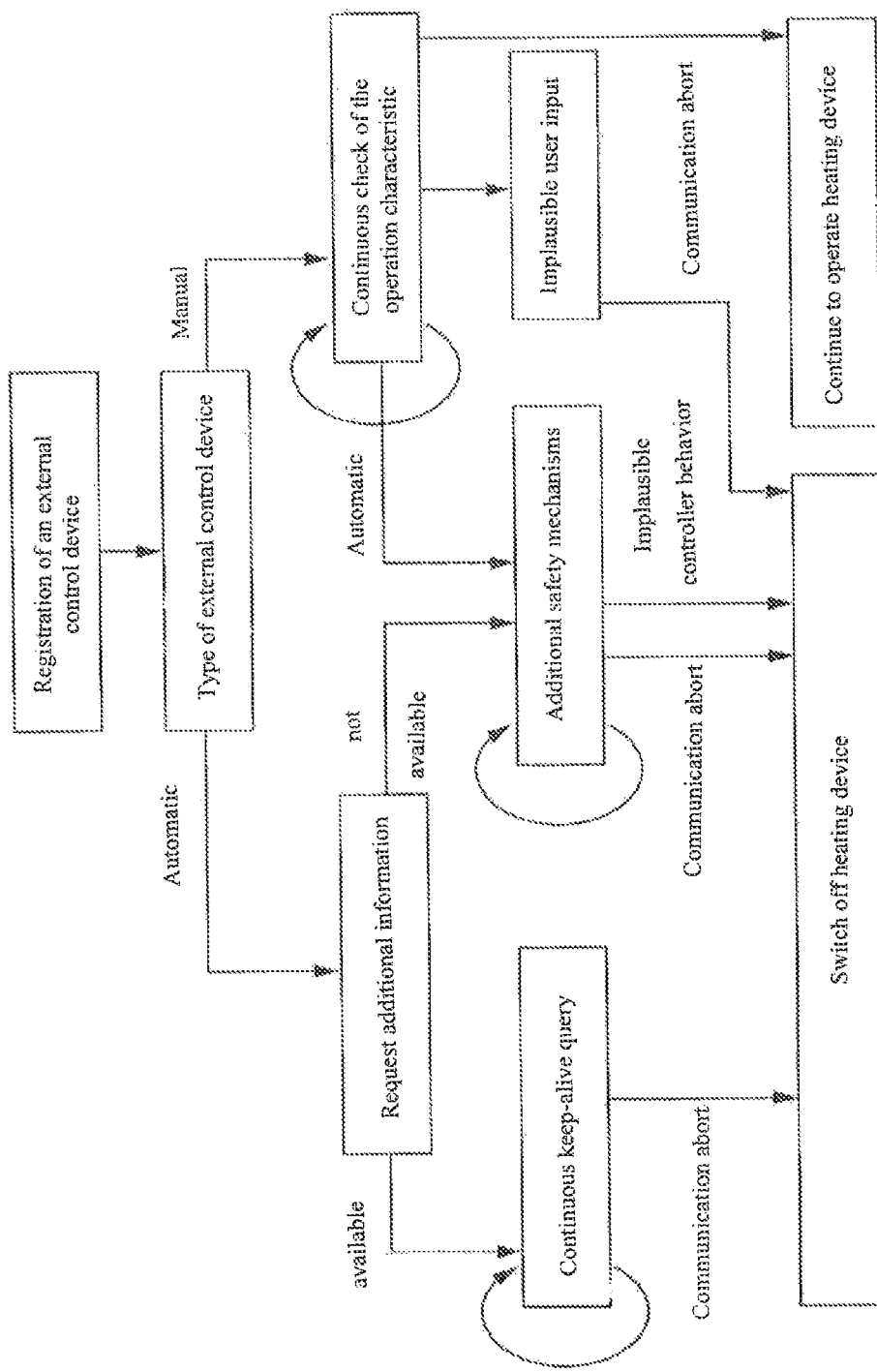
FIG. 3 shows a flowchart of a control method according to the invention.

The invention now plays an important role at this point. In this respect, the diagram in FIG. 3 is also explained. If an external control device registers with the cooking appliance controller for the first time, it must be distinguished or classified as an automatic control device, on the one hand, or as a manual control device, on the other hand. For this purpose, it can initially transmit a particular signal containing the information relating to what type of device the external control device may actually be or is in this case. If it is classified as an automatic control device, additional information may be requested during ongoing operation, for example with respect to the type of process as a boiling process or roasting process or alternatively with respect to a predefined setpoint temperature for the temperature control, as has been described above. If this additional information is available, a continuous keep-alive query of this information or else simply only of the operating state of the cooking appliance or of the external control device can be carried out. It is therefore checked whether the radio connection still exists and the external automatic control device still operates properly. Meanwhile, the operation of the heating device continues. However, if the keep-alive query reveals that the radio connection or communication with respect to the hob is disrupted or the process-relevant additional information no longer properly arrives, the previously controlled heating device is switched off as a safety measure.

If the external control device registers as an automatic control device even though no additional information is available, it can be assumed that the necessary safety standards and the necessary care have not been applied when programming the external automatic control device. In this case, additional safety measures are taken, for example the release of energy is restricted or a maximum temperature is limited. These safety measures are not intended to be discussed any further here, but rather reference is explicitly made to the patent application DE 102017220814.7 by the same applicant with the filing date of 22 Nov. 2017. If communication with the hob is aborted or in the event of an implausible controller behavior with inadequate or very highly varying control commands, the heating device is then switched off, whereas it continues to be operated as before without these events. This is continuously checked.

If the external control device is classified as a manual control device, it can adjust the power of the heating devices, like in the first case as well. However, the operating characteristic is continuously checked. If the situation remains as before with the normal operating characteristic, that is to say the control commands do not change too often and not too regularly at exactly recurring intervals of time, the heating device continues to be operated as before or according to the last valid control command from the external control device. This applies even if the communication is aborted because it is then assumed that, in the case of the manual control device, the operator is still present or at least has given plausible control commands and only the communication between the external control device and the hob has been aborted. The communication abort is therefore no reason to switch off the heating device. If the operator input becomes implausible because, for example, it is too highly varying or erratic too often, which is checked on the basis of the control commands, the heating device is also switched off.

If the continuous check of the operating characteristic, explained in detail above, reveals that the classification as a manual control device no longer applies or has never applied, the external control device is reclassified as an automatic control device. The additional safety measures as explained above are then also taken. In this case, the cooking appliance controller assumes that the external control device has already been incorrectly registered as a manual control device, but is actually an automatic control device. Alternatively, operation could then change to the state as if a classification as an automatic control device had been present from the outset and would be correct. In this case, additional information can then be requested again or the additional safety measures can be directly taken.

The mobile telephone 25 can therefore be initially classified as a manual control device or as an automatic control device depending on what an operator inputs on the mobile telephone and the operation desired or planned by the operator. A change can subsequently result during operation of the hob 11.

The temperature control device 125 can as a rule operate only as an automatic control device. A change in the classification is actually scarcely conceivable or useful here. The invention therefore mainly involves situations such as those involving the mobile telephone 25 or another external control device which can both be types of external control device or can be operated in both ways. Operation with an external automatic control device which, although incorrectly registered as a manual control device, does not violate the additional safety algorithms as a result of its integrated control algorithms can likewise also be carried out, however. The invention makes it possible to greatly increase the safety here when connecting external control devices, in particular with an unpredictable method of operation, to a cooking appliance without losses in the operating comfort and additional benefit which can be provided for an operator by an external control device operating properly.

The invention claimed is:

1. Method for controlling a cooking appliance using an external control device, wherein: said cooking appliance has at least one heating device and an internal cooking appliance controller,
said external control device is arranged outside said cooking appliance, said external control device provides said cooking appliance controller with control commands for controlling at least said heating device, wherein
said external control device is classified by said cooking appliance controller either as an automatic control device or as a manual control device,
following said classification of said external control device, said control commands from said external control device are implemented by said cooking appliance controller,
a check is carried out continuously or at intervals during operation of said cooking appliance in order to determine whether said classification of said external control device still applies; and
if said external control device is classified as an automatic control device, said cooking appliance controller requests additional information in order to determine and check a type of temperature control by said external control device.

2. Method according to claim 1, wherein, before said classification by said cooking appliance controller, said external control device transmits an item of classification information to said cooking appliance controller, which information identifies said external control device as an automatic control device or as a manual control device.

3. Method according to claim 2, wherein said cooking appliance controller also uses further information as a criterion for said classification from a group of: type of control commands, frequency of said control commands, continuity or consistency of said control commands.

4. Method according to claim 1, wherein, if said check reveals that a previous classification still applies, operation of said cooking appliance and of said heating device of said cooking appliance, which are controlled by said external control device, is continued as before.

5. Method according to claim 4, wherein control commands for changing power generation at said heating device are accepted and implemented without change by said cooking appliance controller.

6. Method according to claim 1, wherein, if said check reveals that a previous classification no longer applies, a reclassification is carried out only when not only said criteria for said previous classification are no longer satisfied but also when said criteria for said new classification are explicitly satisfied.

7. Method according to claim 1, wherein, if said check reveals that a previous classification no longer applies, said cooking appliance is changed over to a safety mode.

8. Method according to claim 7, wherein, if said check reveals that said previous classification no longer applies with a change from a manual control device to an automatic control device, said cooking appliance is changed over to a safety mode.

9. Method according to claim 7, wherein said power of a heating device currently operated and controlled by said external control device is reduced to a maximum of 20% of its maximum power.

10. Method according to claim 1, wherein it is queried whether said operation of said heating device of said cooking appliance is a boiling process or a roasting process and what a desired setpoint temperature is for said temperature control.

11. Method according to claim 1, wherein additional information such as an item of temperature information is compared with a temperature probe on said heating device or for said heating device during ongoing operation of said heating device.

12. Method according to claim 1, wherein said external control device is a user interface which can be subsequently connected and is connected to said cooking appliance controller by means of a radio path, wherein said external control device has a temperature sensor as a remote control and is itself arranged on a cookware or is integrated in a cookware, wherein said external control device controls said temperature of said cookware and, for said purpose, specifies power control for said heating device of said cookware to said cooking appliance controller.

13. Method according to claim 1, wherein said external control device is a mobile terminal such as a smartphone or a tablet computer, wherein said mobile terminal controls said temperature directly or via an app running on it for a purpose of specifying a heating power for said heating device by means of control commands.

14. Method according to claim 1, wherein said external control device is wirelessly connected to a temperature sensor using a radio path, wherein said temperature sensor is arranged on a cookware or is integrated in a cookware.

15. Method according to claim 1, wherein, if said external control device is classified as a manual control device and this also still applies after each said check, no restrictions or changes are made to said control commands given by said external control device.

16. Method according to claim 1, wherein operation of said cooking appliance or of said heating device is continued as before as long as said original classification still applies.

17. Method according to claim 1, wherein, during said continuous check or said check carried out at intervals in order to determine whether said classification still applies, a temperature value of a cookware heated with said heating device is queried and said cooking appliance controller checks whether said temperature value corresponds to heating energy previously given to said heating device for said cookware.

18. Method according to claim 1, wherein, during said check in order to determine whether said classification still applies, a frequency of a power adjustment is captured for said heating device, wherein, if said power is changed more than three times per minute, said classification is changed from a manual control device to an automatic control device.

19. Method according to claim 1, wherein, during said check in order to determine whether said classification still applies, it is captured whether said power is adjusted by said external control device either at irregular intervals of time or at regular intervals of time or with integer multiples of a particular time unit.

20. Method according to claim 19, wherein said external control device is classified as a manual control device in said first case and is classified as an automatic control device in said second case.

21. Method according to claim 1, wherein, if classified as an automatic control device, said power of a heating device currently operated by said external control device is reduced to a maximum of 20% of its maximum power if communication with said external control device is aborted.

22. Method according to claim 1, wherein, if classified as a manual control device, said heating device currently operated by said external control device continues to be operated without change if communication with said external control device is aborted.

23. Cooking appliance having at least one heating device and an internal cooking appliance controller, wherein said cooking appliance controller is designed to carry out a method according to claim 1.

24. System having an external control device and a cooking appliance according to claim 23, wherein said external control device is designed to be arranged outside said cooking appliance and is designed to give said cooking appliance controller of said cooking appliance control commands for controlling at least said heating device.

25. Method for controlling a cooking appliance using an external control device, wherein: said cooking appliance has at least one heating device and an internal cooking appliance controller, said external control device is arranged outside said cooking appliance, said external control device provides said cooking appliance controller with control commands for controlling at least said heating device, wherein said external control device is classified by said cooking appliance controller either as an automatic control device or as a manual control device, following said classification of said external control device, said control commands from said external control device are implemented by said cooking appliance controller, a check is carried out continuously or at intervals during operation of said cooking appliance in order to determine whether said classification of said external control device still applies; and during said check in order to determine whether said classification still applies, a frequency of a power adjustment is captured for said heating device, wherein, if said power is changed more than three times per minute, said classification is changed from a manual control device to an automatic control device.

26. Cooking appliance having at least one heating device and an internal cooking appliance controller, wherein said cooking appliance controller is designed to carry out a method according to claim 25.

27. Method for controlling a cooking appliance using an external control device, wherein: said cooking appliance has at least one heating device and an internal cooking appliance controller, said external control device is arranged outside said cooking appliance, said external control device provides said cooking appliance controller with control commands for controlling at least said heating device, wherein said external control device is classified by said cooking appliance controller either as an automatic control device or as a manual control device, following said classification of said external control device, said control commands from said external control device are implemented by said cooking appliance controller, a check is carried out continuously or at intervals during operation of said cooking appliance in order to determine whether said classification of said external control device still applies; and during said continuous check or said check carried out at intervals in order to determine whether said classification still applies, a temperature value of a cookware heated with said heating device is queried and said cooking appliance controller checks whether said temperature value corresponds to heating energy previously given to said heating device for said cookware.

28. Cooking appliance having at least one heating device and an internal cooking appliance controller, wherein said cooking appliance controller is designed to carry out a method according to claim 27.

* * * * *